Dec. 9, 1958 H. W. THORNBURG 2,863,637

FLUID-OPERATED SPUDDING MECHANISM

Filed March 28, 1956 12 Sheets-Sheet 1

HERBERT W. THORNBURG,
INVENTOR

BY John R. Nelson
ATTORNEY

Dec. 9, 1958 H. W. THORNBURG 2,863,637

FLUID-OPERATED SPUDDING MECHANISM

Filed March 28, 1956 12 Sheets-Sheet 2

HERBERT W. THORNBURG

*INVENTOR,*

BY John Boldman Thomas

ATTORNEY

HERBERT W. THORNBURG,
*INVENTOR*

*BY* John R. Nelson

*ATTORNEY*

SPUDDER VALVE

HERBERT W. THORNBURG,
*INVENTOR.*

BY John L. Nelson

*ATTORNEY*

FIRST-PHASE OF TOOL RAISING VALVE SETTINGS

HERBERT W. THORNBURG,
*INVENTOR*

BY John R. Nelson

*ATTORNEY*

SECOND PHASE OF TOOL RAISING VALVE SETTINGS

HERBERT W. THORNBURG,
INVENTOR
BY John R. Nelson
ATTORNEY

TOOL LOWERING VALVE SETTINGS

HERBERT W. THORNBURG,
INVENTOR
BY John R. Nelson
ATTORNEY

Dec. 9, 1958 H. W. THORNBURG 2,863,637

FLUID-OPERATED SPUDDING MECHANISM

Filed March 28, 1956 12 Sheets-Sheet 8

HERBERT W. THORNBURG,
INVENTOR

BY John R. Nelson

ATTORNEY

FLUID-OPERATED SPUDDING MECHANISM

Filed March 28, 1956 12 Sheets-Sheet 9

HERBERT W. THORNBURG,
INVENTOR

BY John R. Nelson

ATTORNEY

HERBERT W. THORNBURG
INVENTOR

BY John R. Nelson

ATTORNEY

TOOL LOWERING VALVE SETTINGS

HERBERT W. THORNBURG,
INVENTOR
BY John L. Nelson
ATTORNEY

Dec. 9, 1958 H. W. THORNBURG 2,863,637

FLUID-OPERATED SPUDDING MECHANISM

Filed March 28, 1956 12 Sheets-Sheet 12

HERBERT W. THORNBURG,
*INVENTOR*

BY John R. Nelson

*ATTORNEY*

United States Patent Office 2,863,637

Patented Dec. 9, 1958

2,863,637

FLUID-OPERATED SPUDDING MECHANISM

Herbert W. Thornburg, South Milwaukee, Wis., assignor to Bucyrus-Erie Company, South Milwaukee, Wis., a corporation of Delaware Application March 28, 1956, Serial No. 574,410

6 Claims. (Cl. 255—10)

1. FIELD OF THE INVENTION

This invention relates to new and useful improvements in fluid-operated spudding mechanisms more particularly for spudder-type cable-tool drills.

Spudder-type cable-tool drills are well known in the art. More recently, they have been actuated by reciprocating hydraulic cylinder-piston assemblies.

In such drills, a cable passes from a winch drum on the drill frame about a cable-engaging means which includes one or more sheaves, one of which is at the upper end of the mast; then downward into the drill hole being drilled in the ground. Suspended at the lower end of this cable is a string of drill tools, terminating in a bit, hammer, pump rod and plunger, or other spudder-actuated tool or implement. The cable-engaging means is reciprocated by an appropriate reciprocating device. By this means, the tools are alternately raised and then dropped. This operation is called "spudding."

Two methods are commonly adopted for actuating the cable-engaging means by the spudding means. In the first method, the reciprocating motion of the spudding means is approximately 180 degrees out of phase with the reciprocating motion of the drill tools, such that as the cable-engaging means moves downward, the tools move upward and vice versa. In the second method, the reciprocating motion of the spudding means is approximately in phase with the reciprocating motion of the drill tools, such that as the cable-engaging means moves downward, the drill tools move downward and vice versa.

2. PROBLEMS OF THE PRIOR ART

In spudder-type cable-tool drills, it is desirable to adjust the length of stroke of the spudding mechanism to control the amount of drill-tool impact for drilling or driving operations, and also to vary the length of stroke of the drill tools to more efficiently mix the drilling mud and water in the hole. Heretofore, the length of stroke could not at will be adjusted without first stopping spudding. This adjustment was made by trial-and-error method, and consequently consumed much time in stopping and starting spudding to attain the desired adjustment in stroke length. Because the drill was not readily adjustable in this respect, the operator often allowed the drill to run at an inefficient cycle.

Also, it is desirable in this type of drill to increase or decrease the frequency of drill-tool strokes. In the past, this has been achieved through increase or decrease of engine speed. This increase or decrease in engine speed may affect the efficiency of the drill cycle by the spudding means either lagging behind or overrunning the drill tools on their downward stroke.

To obtain maximum impact of the drill tools during a drilling or driving operation of a spudder-type cable-tool drill, it is essential that the drill tools fall freely under force of gravity. For maximum drilling efficiency the drill tools must be picked up as quickly as practical after their impact at the bottom of the hole. To accomplish this, the spudding mechanism must reverse quickly from its tool-lowering stroke to its tool-raising stroke, so that pick-up of the drill tools by the cable will be smoothly and simultaneously effected immediately after the energy of the drill tools have been expended. Also, the spudding mechanism should neither lag behind nor overrun the drill tools during the drilling cycle. Lagging behind will retard the gravitational fall of the tools and lessen their impact at the bottom of the hole. Overrunning will cause slack line in the working cable and premature reversal of the drill stroke, which retards downward acceleration of the tools at the end of their downward stroke; the combined effect of slack line and premature return stroke results in a decreased rate of penetration and severe jerks on the cable causing undue shock to both cable and drill machinery.

3. OBJECTS OF THE INVENTION

The principal objects of the present invention are:

(1) To provide an improved spudding mechanism having adjustable time-stroke control, whereby the length of stroke, as well as the frequency of the strokes, may be varied at will while the mechanism is spudding.

(2) To provide an improved spudding mechanism having adjustable stroke, whereby the frequency of stroke may be accurately controlled.

(3) To provide an improved self-synchronizing hydraulically-operated spudding mechanism.

(4) To provide an improved hydraulically-actuated spudding mechanism in which a single hydraulic pressure source is used to power the reciprocating motion of the mechanism, and actuate the control means for the mechanism.

(5) To provide a safety device for a spudding mechanism to automatically stop it whenever substantially no tension remains in the working length of drill cable on the downward stroke of the spudding mechanism.

(6) To provide an improved automatic reversing means for the spudding mechanism, whereby the spudding mechanism reverses from its tool-lowering to its tool-raising stroke, so that the tools are picked up immediately and rapidly after they have fully expended their energy by impact in the bottom of the drill hole.

(7) To provide an improved reciprocating cylinder-piston assembly for actuating a spudding mechanism having characteristics of a fluid cushion in the cylinder of said assembly to cushion the moving metal parts within the cylinder against sharp impact at the end of their stroke in the cylinder.

(8) To provide a simplified reciprocating cylinder-piston assembly for a spudding mechanism.

4. DESCRIPTION OF INVENTION

The present invention consists in the novel parts and in the combination and arrangement thereof, which are defined in the appended claims, and of which two forms are exemplified in the accompanying drawings, hereinafter particularly described and explained.

Throughout the description, the same reference number is applied to the same member or to similar members.

*a. Description of figures*

*b. Description of the first embodiment*

Figures 1, 2:
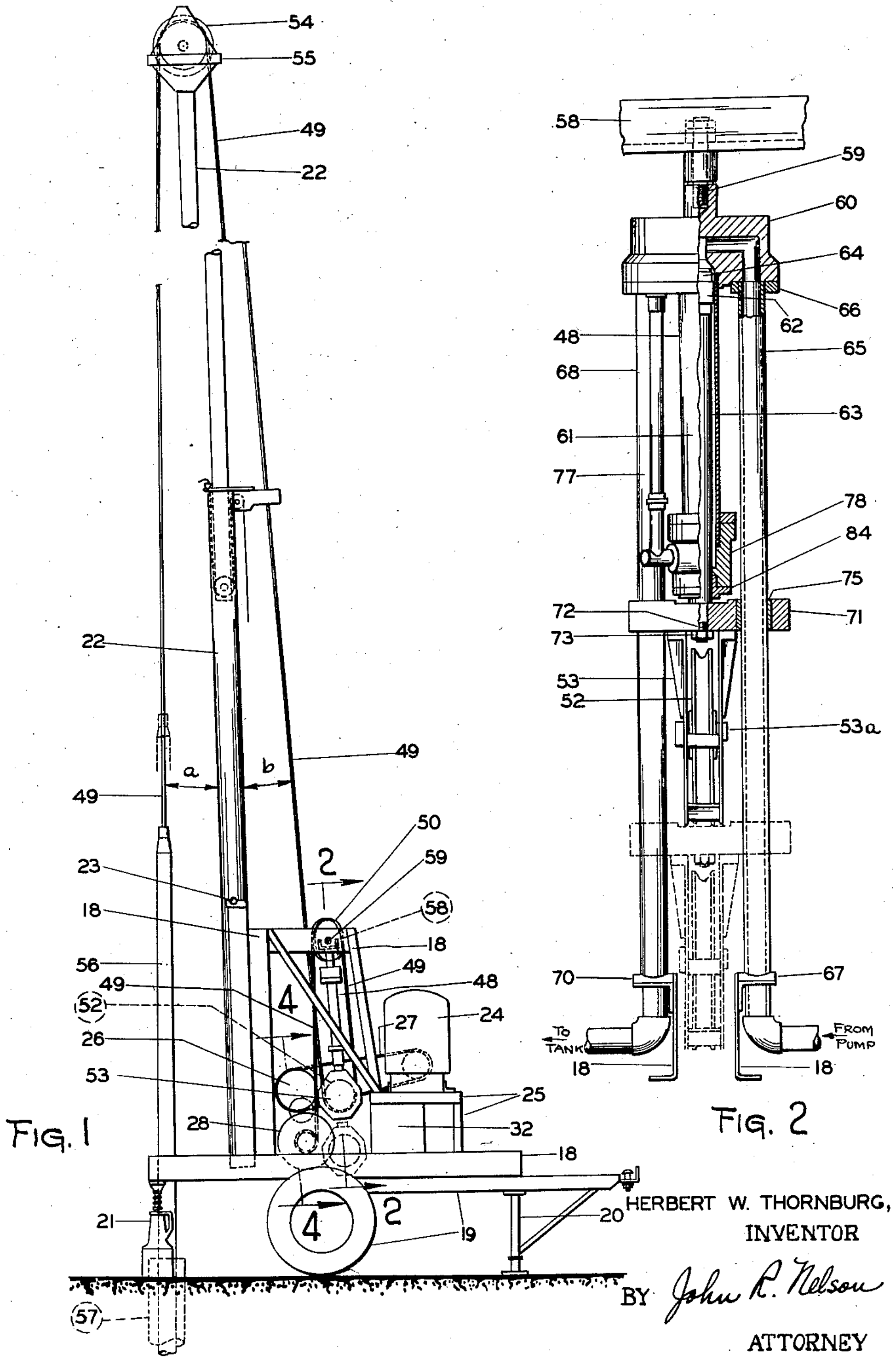
Figure 1 is a side elevation of a drill representing the first embodiment of this invention.
Figure 2 is an enlarged view, partly in section, of the spudding mechanism taken along line 2—2 of Figure 1.

Referring to Figure 1, drill frame 18 is supported by wheeled chassis 19, stand 20 and levelling jacks 21. The frame 18 supports a telescopic derrick 22. Derrick 22 may be telescoped downwardly, then rotated clockwise about transverse hinge pin 23 to fold into horizontal position for transport. Motor 24 is supported on frame 18 by support 25. Motor 24 transmits power through belts 27 to pulley 26 to spool the winch drum 28, drive sand-reel drum 41 (Figure 4) and drive fluid pump 29, as hereinafter described.

Figures 4, 5, 6, 7:
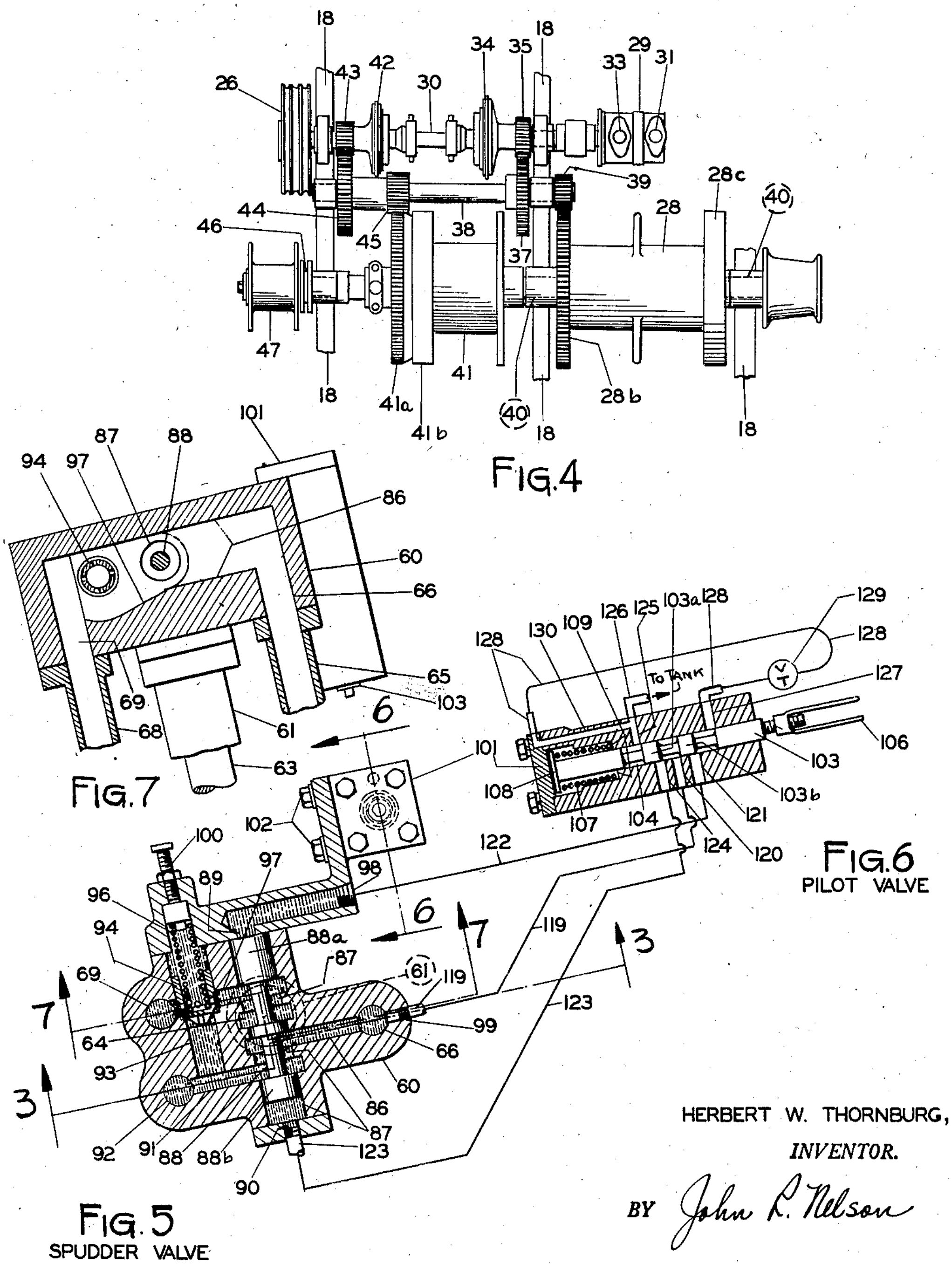
Figure 4 is an enlarged rear elevation of the driving machinery taken along line 4—4 of Figure 1.
Figure 5 is a plan view of the spudding valve taken along line 5—5 of Figure 3.
Figure 6 is a rear view of the pilot valve taken along line 6—6 of Figure 5.
Figure 7 is a side view, partly in section, of the upper end of the cylinder-piston assembly, taken along line 7—7 of Figure 5.

Referring to Figure 4, pulley 26 is keyed to jack shaft 30 journalled on frame 18. Fluid pump 29, mounted on frame 18, is driven by jack shaft 30. Power is transmitted to winch 28 by engaging clutch 34, which couples pinion 35 to jack shaft 30. Pinion 35 meshes with gear 37 keyed to countershaft 38. Pinion 39 is likewise keyed to countershaft 38, and meshes with winch gear **28*b* journalled on drum shaft 40 to drive winch 28 for hoisting. Winch 28 is controlled by winch brake 28*c***.

Sand-reel drum 41 rotates independently of winch 28 on drum shaft 40 and is driven by engaging clutch 42, which couples pinion 43 to jack shaft 30. Pinion 43 meshes with gear 44 built integral with pinion 45. Both gear 44 and pinion 45 are free to rotate on countershaft 38. Pinion 45 meshes with sand-reel gear **41*a*, which is engageable with sand-reel drum 41 through a conventional cone clutch (not shown). Auxiliary drum 47 is drivable by engaging clutch 46 to couple gear 41*a* to auxiliary drum 47**.

Figure 2A:
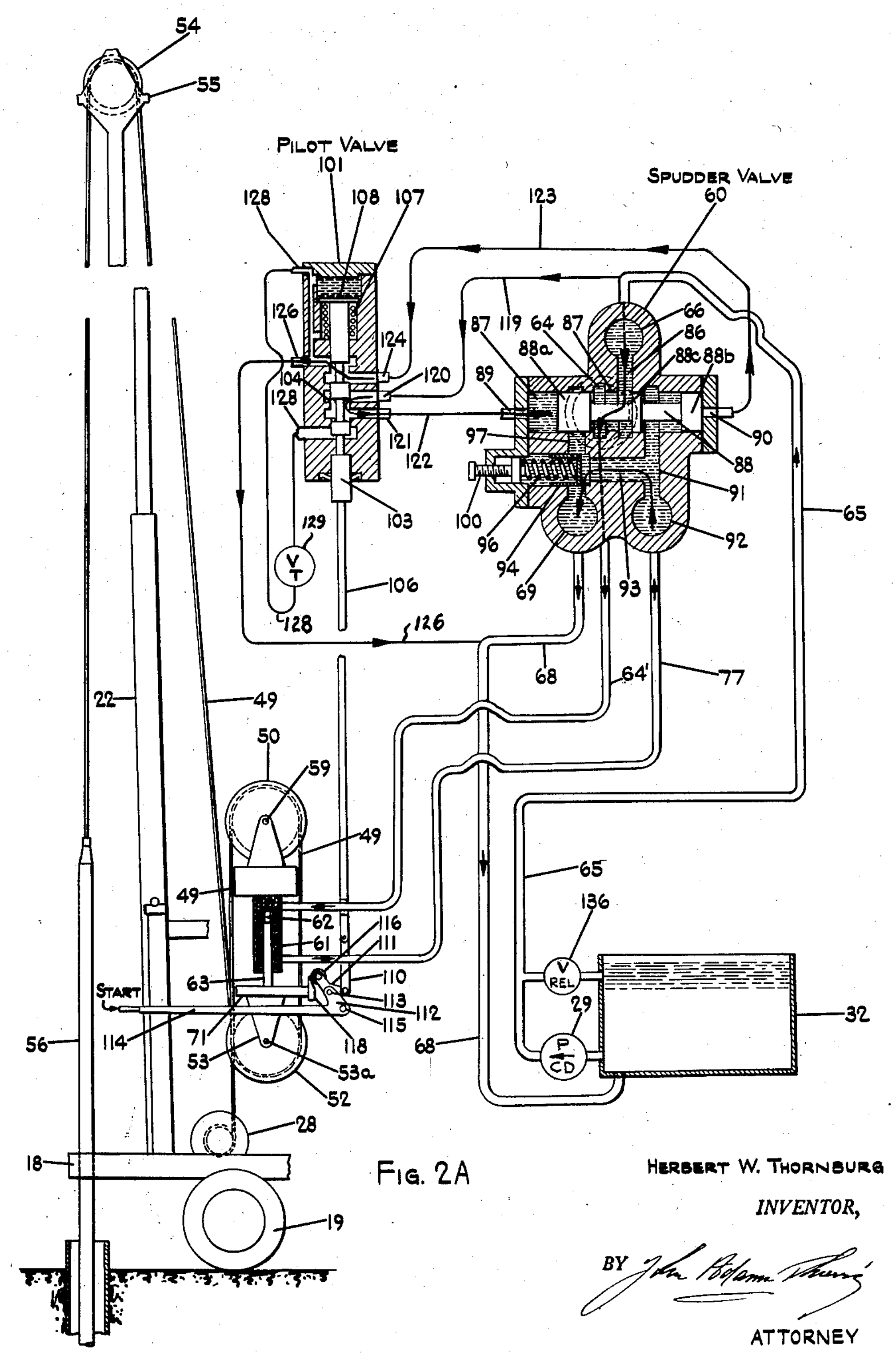
Figure 2A is a largely diagrammatical view of the hydraulic system and essential cooperating elements for operating the spudding mechanism of the drill of Figure 1, showing valve settings for the first phase of tool raising.
Figure 3:
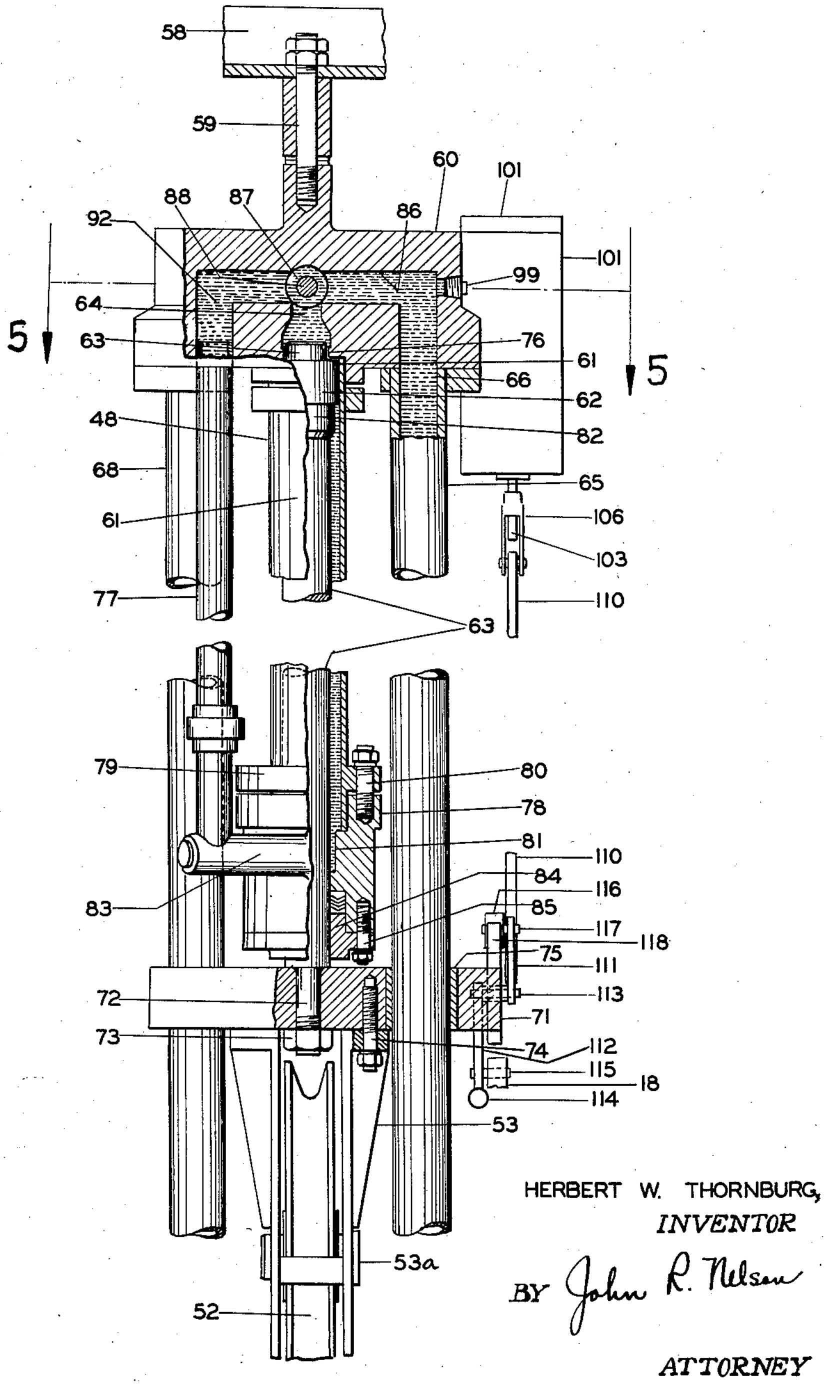
Figure 3 is an enlargement of Figure 2, partly in section, showing the details of the cylinder-piston assembly.

Referring to Figures 1, 2, 2A and 3, from winch drum 28, a cable 49 extends upwardly and over idler sheave 50 pivotally mounted on drill frame 18 by pin 59, then downwardly and around spudding sheave 52 pivotally mounted on shaft **53*a* journalled in spudding sheave block 53 (Figures 2 and 3). Spudding sheave block 53 is operatively connected to cylinder-piston assembly 48 by threaded end 72 (Figures 2 and 3) on piston rod 63 for reciprocating vertical movement with piston rod 63. Cable 49 then extends upwardly over crown sheave 54 (Figure 1), journalled in sheave block 55 at the top of derrick 22 and then downwardly to support and reciprocate a string of drill tools 56** terminating in a bit (not shown).

The angle "*b*" (Figure 1) formed between the reach of cable 49 from spudding sheave 52 to crown sheave 54 and the derrick 22 is equal to the angle "*a*" formed between the reach of cable 49 from drill tools 56 to crown sheave 54 and derrick 22. Cylinder-piston assembly 48 is attached to frame 18 in a manner such that the longitudinal axis of piston rod 63 of said assembly is parallel at all times to the reach of cable 49 extending from spudding sheave 52 to crown sheave 54. Thus, it can be readily seen that, in this invention, the derrick, except for the effect of its own weight, is at all times under a balanced loading forwardly and rearwardly. This method of derrick loading eliminates any need for external derrick braces or guy wires.

Figure 11:
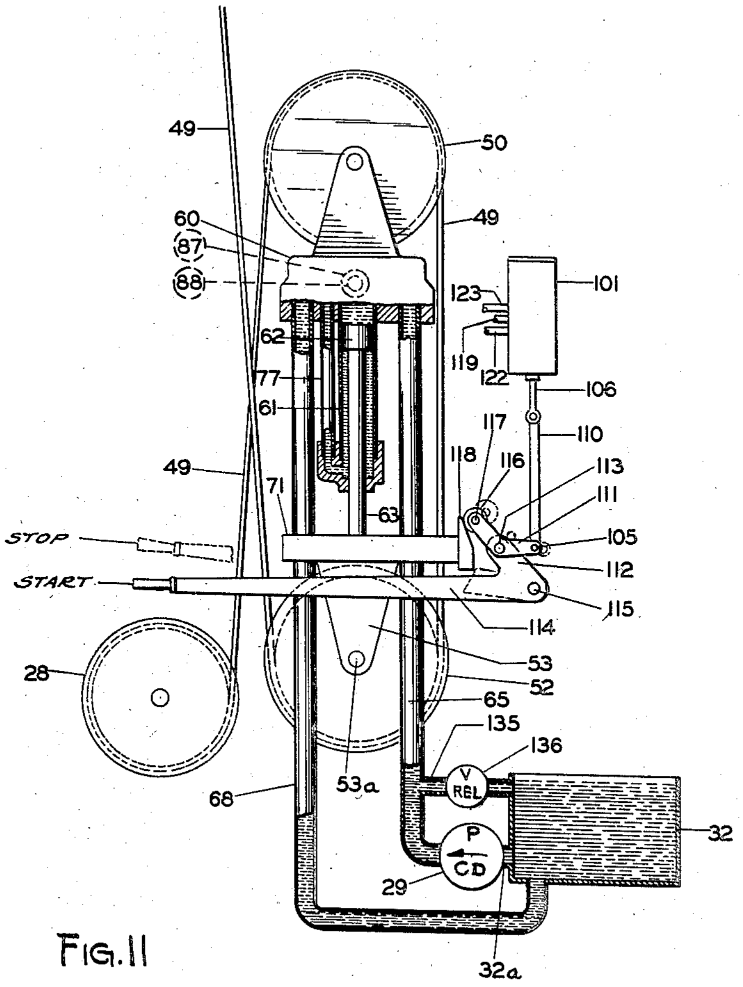
Figure 11 is a schematic side view of the spudding mechanism for the first embodiment of this invention shown near the end of the drill-tool-lowering strike. The pilot valve is partially shifted to its tool-raising position.

Fluid tank 32 is supported on main frame 18 below support 25 (Figure 1) and serves as a sump for hydraulic fluid. Inlet port 33 on fluid pump 29 (Figure 4) is connected to tank 32 (Figure 1) by fluid line **32*a* (Figure 11). Outlet port 31 of pump 29 is connected to fluid supply line 65 (Figures 2 and 3) to conduct fluid under pressure to the cylinder-piston assembly 48** (Figures 2 and 3).

Referring now to Figures 2 and 3, cylinder-piston assembly 48 is attached to rigid channel support 58 on frame 18 by stud 59. A spudder valve 60 is located at the upper end of cylinder-piston assembly 48. Cylinder 61 of said assembly, housing piston 62 and piston rod 63, is rigidly attached to the underside of spudder valve 60. Fluid enters or exhausts from the upper end of cylinder 61 through cylinder port 64. Fluid supply line 65 is connected at one end to pump outlet port 31 (Figure 4), and is rigidly attached at its other end to spudder valve 60 at its inlet port 66. Fluid supply line 65 is parallel to the longitudinal axis of cylinder 61 and is rigidly attached to the drill frame 18 by bracket 67 (Figure 2) on frame 18. Fluid exhaust line 68 is rigidly attached to spudder valve 60 at its exhaust port 69 (shown in cross section in Figure 7) and is likewise parallel to the longitudinal axis of cylinder 61. Fluid exhaust line 68 is rigidly attached to drill frame 18 by bracket 70 on frame 18. Cross-head 71 is attached to the end of piston rod 63 at threaded end 72 by nut 73. Spudding-sheave block 53 is fastened to the under-side of crosshead 71 by studs 74 (Figure 3). Crosshead 71 is fitted to slide on fluid supply line 65 and fluid exhaust line 68 at bearings 75. Thus, as the piston 62 reciprocates vertically, fluid lines 65 and 68 serve as crosshead guides for crosshead 71.

In Figure 3, cylinder port 64 of spudder valve 60 is provided with upper cylinder sleeve 76. The upper end of piston rod 63 extends above piston 62, so that, as piston 62 approaches its uppermost position, the top of piston rod 63 fits in the upper cylinder sleeve 76 with a slight clearance. As piston 62 moves upward, fluid above it is free to exhaust through cylinder port 64 into spudder valve 60 and back to the tank, but as the top of piston rod 63 enters upper cylinder sleeve 76, this exhaust flow is restricted. The volume of fluid remaining above piston 62 is metered through the annular clearance space between the upper extension of piston rod 63 and upper cylinder sleeve 76 into cylinder port 64 until piston 62 slowly comes to rest against the upper end of cylinder 61. Thus, piston 62 is provided with an hydraulic cushion at the upper extremity of its travel to prevent any severe metal-to-metal impact between it and the upper end of cylinder 61.

A similar hydraulic cushioning is provided at the lower extremity of piston travel. Fluid is exhausted from the lower end of cylinder 61 through exhaust port 83 into cylinder exhaust line 77, then into spudder valve 60 and back to the tank through fluid exhaust line 68. Lower cylinder exhaust assembly 78 is attached to flange 79 at the lower end of cylinder 61 by studs 80. The bore 81 of assembly 78 is smaller in cross section than the bore of cylinder 61 and forms a lower cylinder sleeve to receive enlarged section 82 of piston rod 63, providing a slight clearance therebetween when piston 62 is in its lowered position. Stuffing box 84 is bolted to assembly 78 by studs 85. As piston 62 approaches its lowermost position, enlarged section 82 of piston rod 63 enters lower cylinder sleeve 81. Until this point on the downward stroke of piston 62, fluid below piston 62 exhausts unrestricted through exhaust port 83 on lower cylinder exhaust assembly 78 and to the tank through cylinder exhaust line 77, spudder valve 60 and fluid exhaust line 68, but as enlarged section 82 of piston rod 63 enters lower cylinder sleeve 81 this flow of exhaust fluid is restricted. The volume of fluid remaining below piston 62 is then metered through the annular clearance space between enlarged section 82 and lower cylinder sleeve 81 into exhaust port 83, and piston 62 slowly comes to rest against assembly 78 at the lower end of cylinder 61. Thus, piston 62 is provided with an hydraulic cushion at the lower extremity of its travel to prevent severe metal-to-metal impact between it and lower cylinder assembly 78.

Referring to Figures 5–7, the control elements for the hydraulic cylinder-piston assembly will now be described.

Figure 5 is a cross-section of spudder valve 60 having an inlet port 66 for introducing fluid from fluid pump 29 into passage 86 and valve spool chamber 87. Valve spool 88 is fitted in valve-spool chamber 87 for axial sliding movement therein, and is actuated in one direction by pilot fluid under pressure entering at pilot port 89 bearing against land **88*a* of valve spool 88, and is actuated in the other direction by pilot fluid under pressure entering at pilot port 90 bearing against land 88*b* of valve spool 88**.

When valve spool 88 is in its drill tool-lowering position, as shown in Figure 5, fluid under pressure from pump 29 and supply line 65 enters valve 60 at inlet port 66, passes through passage 86, main valve chamber 87, and into passage 91. Fluid then flows to port 92 and to passage 93, opening resistance valve 94, and to the tank through exhaust port 69 and fluid exhaust line 68 (Figure 7). Fluid under pressure will also flow into pilot port 99 and pilot line 119 to supply pilot fluid to the pilot system controlled by pilot valve 101 (Figure 6). The means for maintaining this pilot pressure will be hereinafter explained in detail.

When piston 62 is travelling upward under the influence of the weight of the tools during their downward stroke, part of the fluid from passage 91 will flow into port 92, due to resistance valve 94, and through cylinder exhaust line 77, lower exhaust port 83 on cylinder 61 to fill the increasing volume below piston 62 of cylinder 61 caused by piston 62 moving upwardly. Fluid will also flow from passage 91 through passage 93 and open resistance valve 94. Spring 96 tends to close resistance valve 94 in passage 93. Fluid then flows into annular valve passage 97 (shown more clearly in Figure 7) and through exhaust port 69, fluid exhaust line 68 to tank 32 (Figure 11).

Figure 6 is a cross-section of pilot valve 101 mounted on spudder valve 60 by cap screws 102 (Figure 5). Pilot valve 101 controls flow of pilot fluid from pump 29 alternatively to either of pilot ports 89 or 90 of spudder valve 60. Pilot valve 101 has a spool 103 fitted for axial movement in spool chamber 104. Spool 103 is normally held to the left in Figure 6 by spring 107 compressed between collar 108 on the end of spool 103 and annular shoulder 109 in spool chamber 104.

Spool 103 is shiftable to the right in Figure 6 responsive to a reversing means actuated by a member cooperating with the reciprocating piston rod 63 whenever piston 62 is near the end of its tool-lowering stroke. The details of this reversing means will be later described hereinafter.

Figure 10:
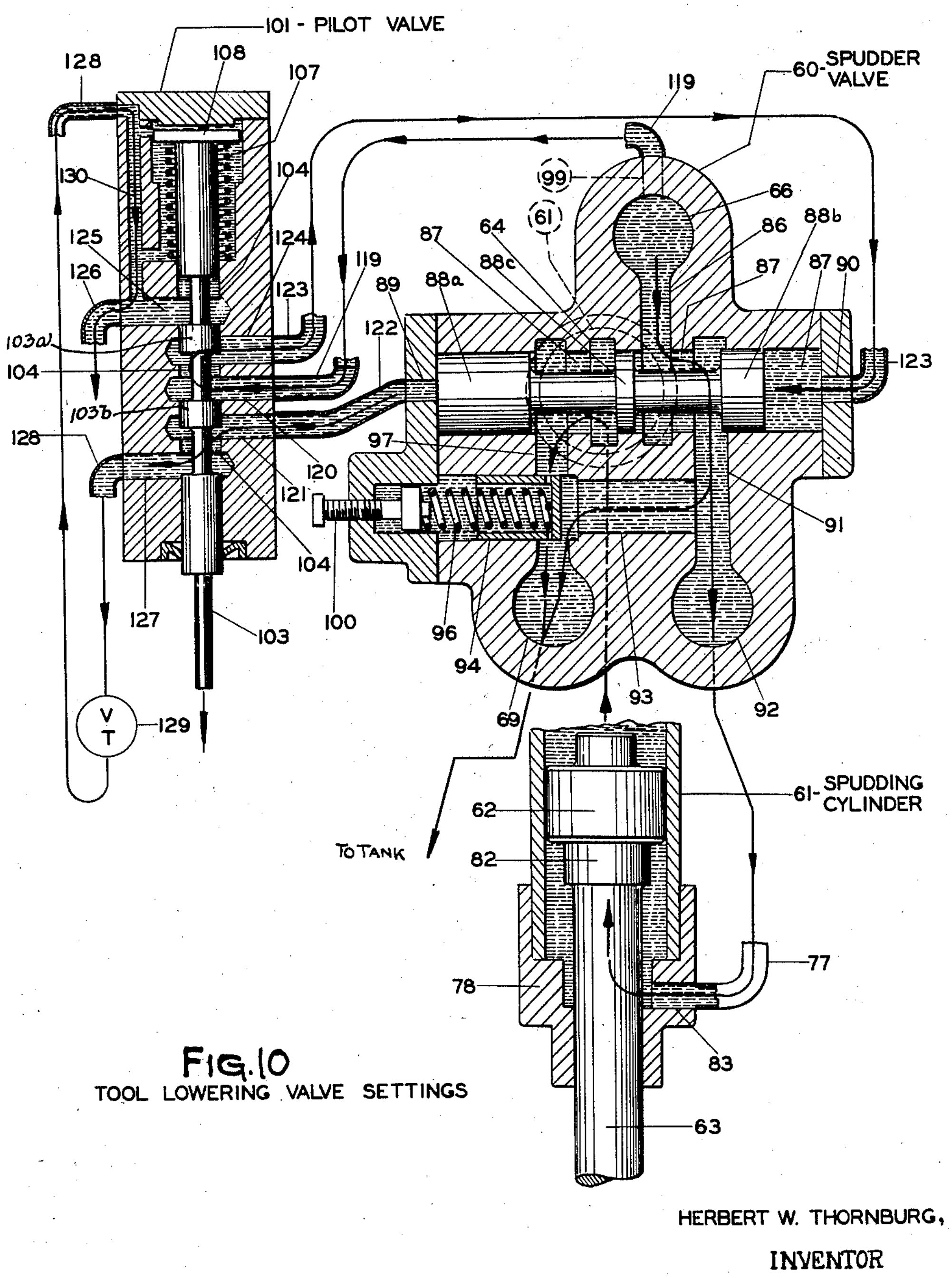
Figure 10 is a schematic plan view, similar to Figures 8 and 9, showing the valve settings for the drill-tool lowering stroke.

When spool 103 is held in the position shown in Figures 6 and 10, fluid under pressure at pilot port 99 flows through pilot pressure line 119 into center port 120 on pilot valve 101, then into pilot-valve spool chamber 104 between lands **103*a* and 103*b* of spool 103, then through port 124, pilot line 123, and pilot port 90 (Figure 5) into the adjacent end of valve spool chamber 87. Pilot fluid entering valve spool chamber 87 at pilot port 90 shifts valve spool 88 axially into the position shown in Figure 5 causing pilot fluid at the other end of valve spool chamber 87 to exhaust through pilot port 89, port 98, pilot line 122, into port 121 on pilot valve 101 (Figure 6), then through pilot valve spool chamber 104 to the right of land 103*b* of spool 103, and passage 127 into exhaust line 128. An adjustable throttle valve 129 is interposed in pilot valve-exhaust line 128 to restrict the flow of pilot fluid exhausted to the tank through exhaust line 128, passage 130 in pilot valve 101, and pilot exhaust line 126. Throttle valve 129 forms an adjustable control means for controlling the time-rate of shift of the spudder valve-control means, thereby at will to vary the length of stroke of the spudding mechanism by restricting flow of pilot exhaust fluid from valve-spool chamber 87 (Figure 5) adjacent land 88*a*, to the tank through pilot port 89, port 98, pilot line 122, port 121 (Figure 6), spool chamber 104, into passage 127, exhaust line 128, throttle valve 129, passage 130 and pilot exhaust line 126. By varying the restriction to flow in throttle valve 129, the rate of shift of valve spool 88 may be varied from its tool-raising to it tool-lowering position, which will vary the length of time that fluid from the pump is transmitted into the working cylinder 61 through cylinder port 64 and line 64' for actuating piston 62 downwardly (Figures 1, 2 and 3), during the tool-raising stroke. This constitutes one of the novel features of this invention. The throttle valve 129 or equivalent one-way adjustable restriction means could be inserted at any point in the pilot system between pilot valve 101 and tank 32 so as to restrict flow of pilot fluid from the spudder valve at pilot port 89 through pilot valve 101** to the tank.

When spool 103 is shifted to the position shown in Figures 2A and 8, i. e. to the right in Figure 6, by the reversing means (hereinafter described), pilot fluid will then flow through pilot-pressure line 119, port 120, spool chamber 104 between enlargements **103*a* and 103*b* on spool 103, and then through port 121, pilot line 122, and pilot port 89, into the adjacent end of valve spool chamber 87. Pilot fluid entering valve spool chamber 87 at pilot port 89 shifts valve spool 88 axially in the other direction (downwardly in Figure 5 and to the right in Figures 2A and 8) in chamber 87, causing pilot fluid at the opposite end of valve spool chamber 87 to exhaust to the tank through ports and passages 90, 123, 124, 104, 125 and 126. Since exhaust of pilot fluid in this last-mentioned setting of spool 103 is unrestricted, valve spool 88** shifts rapidly to the tool-raising position due to the sharply-increased pilot pressure (hereinafter described) shortly after said shift begins. This quick shift of the spudder valve to the tool-raising position allows the spudding mechanism to pick up the tools immediately after they have fully expended their energy by impact in the bottom of the drill hole.

Referring to Figure 11, as well as Figure 6, the mechanism for shifting spool 103 to its tool-raising position (to the right in Figure 6) will now be described.

Yoke 106 is screwed onto the threaded end of spool 103 and is pin-connected to link 110 (Figure 11). Link 110 is pin-connected to bellcrank 111 by pin 105. Bellcrank 111 is pin-connected to arm 112 of control lever 114 by pin 113. Control lever 114 carrying arm 112 is pivoted on shaft 115 on the drill frame 18. Cam roller 116 is pin-connected to bellcrank 111 by pin 117, Cam 118 is rigidly attached to crosshead 71 for reciprocating movement therewith.

When control lever 114 is in its lower or "start" position (solid outline in Figure 11), cam roller 116 lies in the vertical path of cam 118 reciprocating with crosshead 71. As piston 62 aproaches the end of its upward stroke (downward stroke of the drill tools), cam 118 engages cam roller 116 and the pitch of said cam cooperating with cam roller 116 rotates bellcrank 111 clockwise about pin 113. This rotation shifts spool 103 of pilot valve 101 downward (to the right in Figure 6), diverting flow of pilot fluid under pressure in pilot line 119 from pilot port 90 to pilot port 89 on spudder valve 60 (Figure 5). After valve spool 88 shifts to conduct fluid from the pump 29 to cylinder 61 to begin the downward stroke of piston 62 (tool-raising stroke), cam 118 (Figure 11) travels downward a substantial amount and disengages cam roller 116. Spring 107 then shifts spool 103 back to its upper position (to the left in Figure 6), thereby rotating bellcrank 111 and cam roller 116 counterclockwise to again align cam roller 116 with the vertical path of cam 118.

When control lever 114 is moved to its upper or "stop" position (dotted outline in Figure 11), arm 112 rotates clockwise with control lever 114 on shaft 115. In this position, cam roller 116 is removed from vertical alignment with cam 118, and spool 103 of pilot valve 101 will, therefore, remain in its tool-lowering position (to the left in Figure 6), because, as piston 62 moves upwardly during the downward stroke of the drill tools, cam 118 fails to engage cam roller 116 to pivot bellcrank 111 and shift spool 103. The drill tools will then come to rest at the bottom of their stroke.

In Figure 11, a return line 135 is connected between the tank 32 and fluid supply line 65 at a point intermediate the pump 29 and spudder-valve 60. Adjustable relief valve 136, interposed in return line 135, regulates the operating pressure of the spudding mechanism. By setting relief valve 136 to substantially zero-pressure setting, fluid will flow from the pump back to the tank through lines 65, 135 and 136. Alternatively, relief valve 136 may also be used as a "stop-start" valve supplementary to or in place of control lever 114.

*c. Operation of the first embodiment*

Referring to Figures 2A and 8–11, the improved spudding operation of this invention will now be described.

(1) SPUDDING MECHANISM SET TO "STOP" SPUDDING

After spudding is stopped, piston 62 and its associated moving elements 63, 71 and 118 are in their uppermost positions, and since the spudding mechanism and drill tools are approximately 180 degrees out of phase with one another in the first embodiment of this invention, the drill tools are thus in their lowermost position.

With control lever 114 set in its "stop" position (Figure 11), spool 103 of pilot valve 101 is in its upper or tool-lowering position (Figure 10). At this setting, while pump 29 is operating, fluid from the pump flows into spudder valve 60 at inlet port 66, then through passage 86 and chamber 87 into passage 91. Piston 62 is at the upper end of its stroke (drill tools are at the lower end of their stroke) and cylinder 61 is filled with fluid below piston 62; therefore, the fluid from the pump flows through exhaust passage 93, shifting resistance valve 94 to open, to permit fluid to exhaust into annular valve passage 97 and exhaust port 69, and return to the tank through fluid exhaust line 68 (Figure 11).

At this the "stop" position, resistance valve 94 by resisting flow from the pump to the tank, sets up a back pressure in the system to create pilot pressure at port 99 to maintain valve spool 88 in its tool-lowering position (Figure 10) and for shifting valve spool 88 to its tool-raising position (Figure 8) when control lever 114 is set to "start."

(2) SPUDDING MECHANISM SET TO "START" SPUDDING

By shifting control lever 114 to "start" (lower position in Figure 11), cam roller 116 is shifted to the left to engage cam 118, thereby pivoting bellcrank 111 clockwise about pin 113. This clockwise rotation of bellcrank 111 shifts spool 103 of pilot valve 101 to its lower or tool-raising setting (Figures 2A and 8). Pilot pressure in pilot line 119 flowing into pilot valve 101 at port 120 passes through spool chamber 104, and through port 121, pilot line 122, and port 89, to shift spudder valve spool 88 to the right. As spool 88 shifts to the right, pilot fluid is exhausted through pilot port 90, pilot line 123, and port 124 into the upper part of pilot valve spool chamber 104, then through passage 125 and pilot exhaust line 126 to the tank. The spudding mechanism then begins its tool-raising stroke in the following manner.

Fluid from the pump enters spudder valve 60 at inlet port 66 and flows into valve spool chamber 87 and port 64 at the upper end of cylinder 61 (Figure 3). Piston 62 is actuated downwardly to raise the drill tools. Fluid in cylinder 61 beneath piston 62 is exhausted to the tank after flowing through exhaust port 83, cylinder exhaust line 77, port 92, exhaust passage 93, and opening resistance valve 94, through exhaust port 69 and fluid exhaust line 68. As soon as piston 62 and associated elements 63, 71 and 118 have moved downwardly a substantial distance, cam roller 116 and cam 118 disengage (Figure 11). Spool 103 of pilot valve 101 then shifts upwardly to its tool-lowering setting in Figures 9 and 10 under force of spring 107. With spool 103 shifted to this position, pilot fluid now flows from pilot-pressure line 119 into port 120, then through pilot-spool chamber 104, port 124, and pilot line 123, into pilot port 90 on spudder valve 60, to the right of land 88*b* to begin shifting valve spool 88 to the left. Pilot fluid in valve chamber 87 to the left of land 88*a* of valve spool 88 flows out of pilot port 89, through pilot line 122, port 121, pilot spool chamber 104, passage 127 and into exhaust line 128. A conventional adjustable throttle valve 129 (shown schematically) is interposed in exhaust line 128, for retarding flow of exhausted pilot fluid flowing to the tank. By retarding this flow of fluid from pilot port 89, movement of valve spool 88 to the left is retarded. The slower valve spool 88 is permitted to move to the left, the greater length of stroke piston 62 will be permitted to make, since fluid from the pump will flow into cylinder port 64 and cylinder 61 for a longer period of time. If the restriction in throttle valve 129 is increased, the length of the tool-raising stroke of the spudding mechanism is thereby increased, but if the restriction in throttle valve 129 is decreased, the length of tool-raising stroke of the spudding mechanism is thereby shortened. Thus, the length of stroke of the spudding mechanism is readily adjustable during spudding by adjustment of throttle valve 129.

Figure 8:
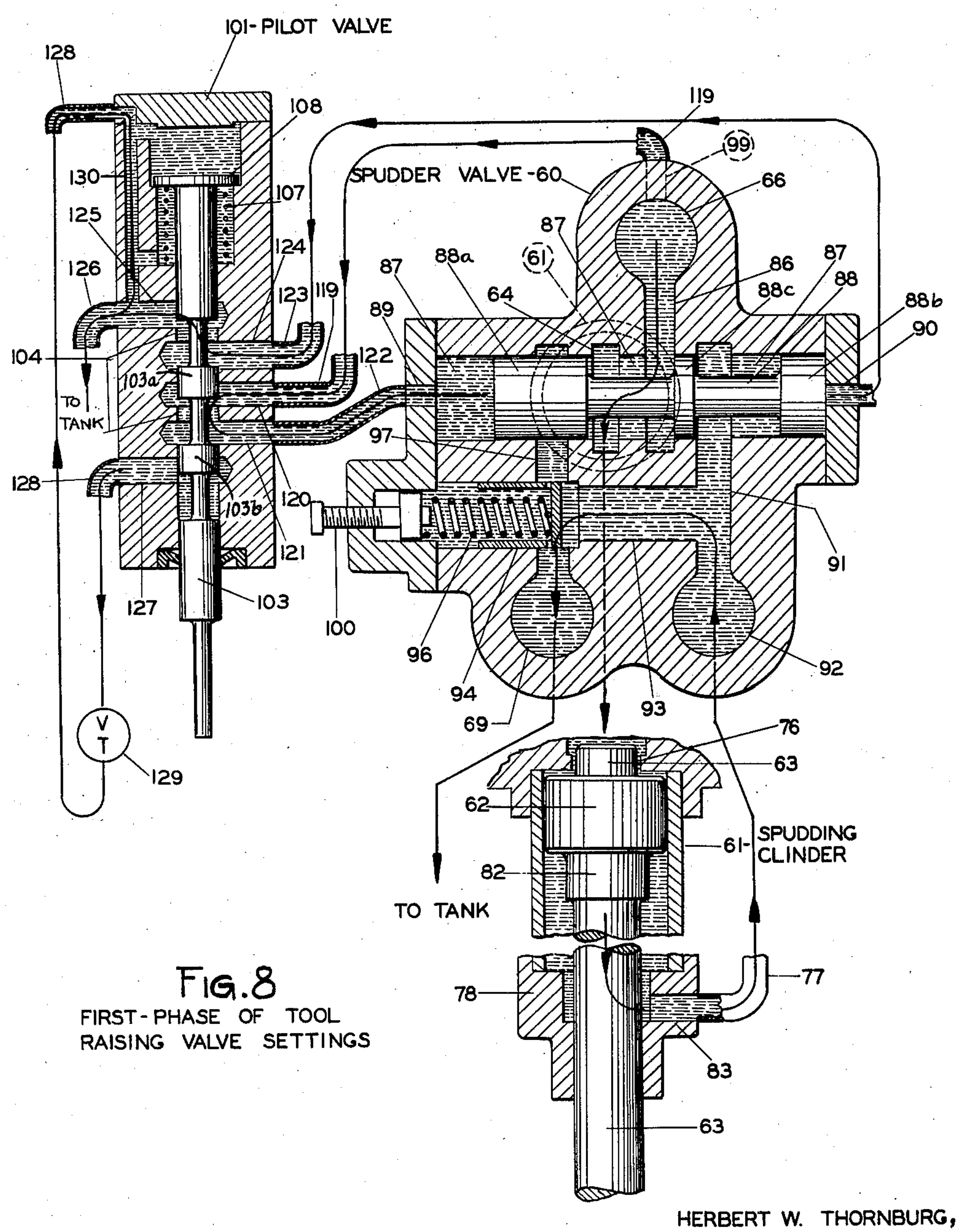
Figure 8 is a schematic plan view of the spudding valve, pilot valve and fluid circuits for the spudding mechanism of the first embodiment of this invention showing the valve settings at the beginning of the first phase of the drill-tool raising stroke after the pilot valve has shifted.
Figure 9:
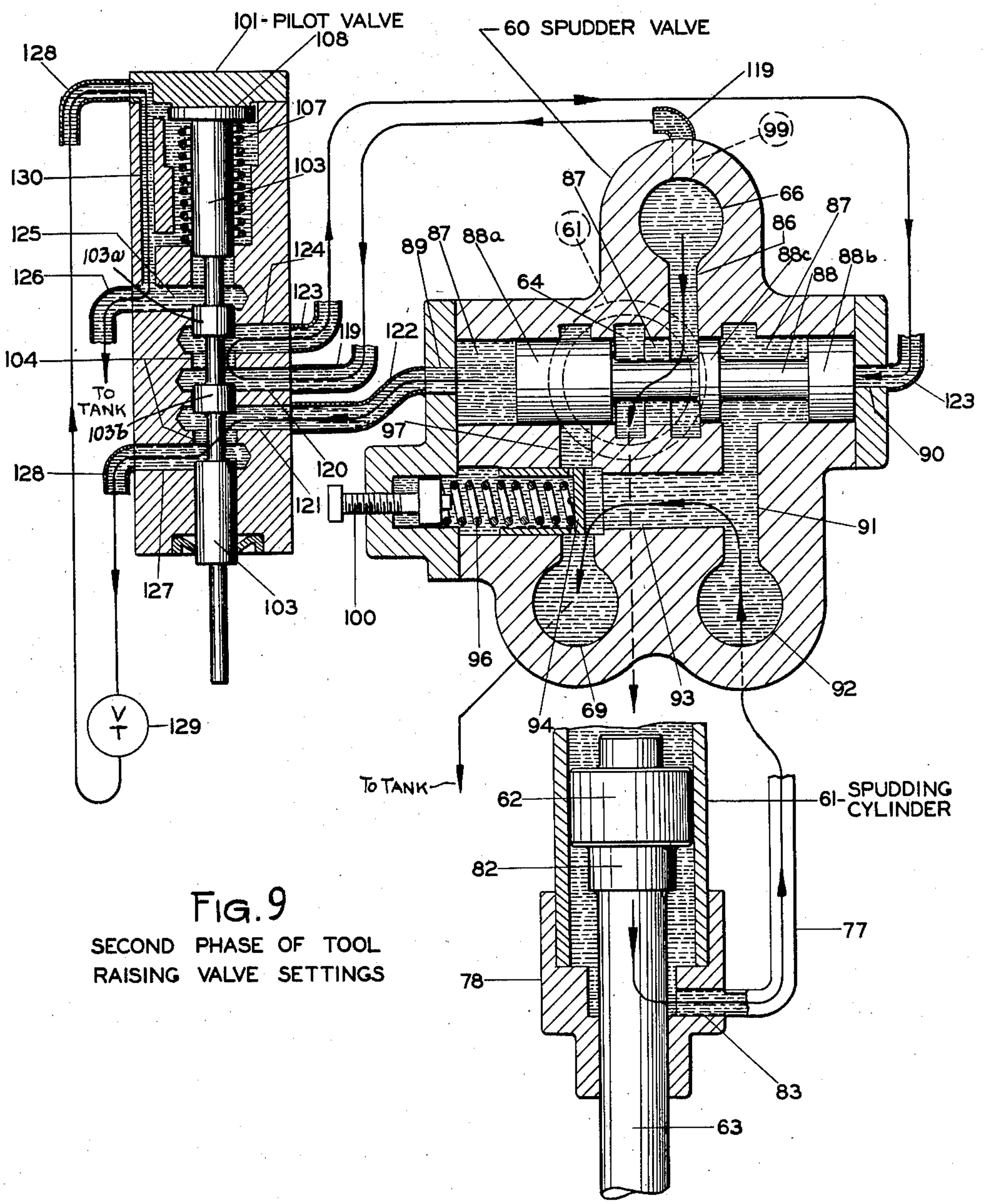
Figure 9 is a schematic plan view, similar to Figure 8, showing the valve settings at the beginning of the second phase of the drill-tool raising stroke.

The frequency of strokes of the spudding mechanism is directly proportional to its length of stroke, which is controlled by the rate of shift of valve spool 88 to the left (Figures 8, 9 and 10). If this shift of valve spool 88 is fast, then the frequency of spudding strokes will be high and the length of stroke will be short. But, if the shift of valve spool 88 is slow, then frequency of spudding stroke will be low and the length of its stroke will be long.

After land 88*c* of valve spool 88 has shifted sufficiently to the left to partially block passage 86, flow of fluid from the pump into chamber 87 is momentarily partially blocked. During this time, the combined upward momentum of the drill tools and downward momentum of the spudding mechanism are spent and the drill tools reverse gradually to begin their downward stroke. By this means, a slow reversal from the tool-raising stroke to the tool-lowering stroke is accomplished, which eliminates any chance of slack line accumulating on the spudding mechanism at the top of the bit-raising stroke.

After valve spool 88 has shifted to the tool-lowering position shown in Figure 10, the drill tools continue their downward stroke under force of gravity.

During gravitational fall of the drill tools, elements 62, 63, 71, 118, 53 and 52 of the spudding mechanism must be raised against the force of gravity. Fluid from the pump is utilized to substantially support the weight of these elements during the fall of the tools so that the tool-lowering motion of the spudding mechanism is responsive to the tension in working cable 49 caused by fall of the tools. This is accomplished by the following characteristics of the spudder valve, which introduces the combined features of self-synchronization and safety, both hereinafter explained.

Fluid from the pump enters spudder valve 60 at inlet port 66 and flows through passage 86 and valve-spool chamber 87 into valve passage 91 (Figure 10). Fluid then flows first into port 92, through cylinder-exhaust line 77 to cylinder 61 tending to raise piston 62 and associated elements 63, 71, 118, 53 and 52, but as pressure builds up in cylinder 61 to overcome the weight of these elements, said pressure being substantially equal to the force necessary to overcome the force of spring 96, resistance valve 94 will open and fluid will flow from valve passage 91 through exhaust passage 93, past resistance valve 94 and to the tank by way of exhaust port 69 and fluid exhaust line 68. The force of spring 96 in resistance valve 94, which normally tends to block the flow from exhaust passage 93 into exhaust port 69, is adjustable by adjusting screw 100.

During spudding, the spudding mechanism is synchronized with the drill tools by adjustment of resistance valve 94 by adjusting the tension in spring 96 so that the pressure required to open resistance valve 94 is equal to the pressure in cylinder 61 necessary to balance the weight of elements 62, 63, 71, 118, 53 and 52 of the spudding mechanism. Hence, if no outside force is exerted on the spudding mechanism through cable 49 on spudding sheave 52 (Figure 11), the forces on piston 62 are substantially balanced and the spudding mechanism will not move. Therefore, on the downward stroke of the drill tools, only a slight force through cable 49 on spudding sheave 52, is necessary to overcome this balance to move piston 62 upwardly.

By this means, the spudding mechanism is synchronized with the fall of the drill tools and is thus prevented from either substantially retarding or overrunning the drill tools during their downward stroke.

As piston 62 continues to move upwardly (Figure 11) to a point near the end of the downward stroke of the drill tools, cam 118 engages cam roller 116, and pilot valve 101 is again shifted to the position shown in Figure 8. Pilot pressure in pilot line 119 flows through passages 120, 104, 121 and 122, into pilot port 89 on spudder valve 60 and valve spool 88 is rapidly shifted to the right. The shift of valve spool 88 is not retarded in this direction, as is the case when it shifts to the left, because pilot fluid to the right of land 88*b* of valve spool 88 in valve-spool chamber 87 flows back to the tank through pilot ports and passages 90, 123, 124, 125 and 126 unrestricted. If valve spool 88 shifts rapidly to the right, the spudding mechanism will shift quickly from its drill-tool lowering to its drill-tool raising stroke, because fluid entering valve-spool chamber 87 through passage 86 will be quickly diverted to flow into cylinder port 64. Accordingly, the spudding mechanism picks up the drill tools quickly at the end of the drill-tool lowering stroke, thereby quickly relieving the compression forces in the formation being drilled. In this manner, the drilling efficiency of the drill tools is greatly increased.

(3) SAFETY FEATURE

The resistance valve 94 in the above-described arrangement also serves as a safety device in the event that the length of working cable 49 becomes excessive, such as, for example, if the drill tools foul in the hole. Fouling of the drill tools often occurs when a rock or other foreign object plugs the drill hole to prevent the drill tools from bottoming in the hole. When this condition arises the tension in cable 49 is reduced substantially to zero. Then, as fluid from the pump flows through ports 66 and 92 of the spudder valve 60 into lower port 83 of cylinder 61 (Figure 10), the weight supported on piston 62 being substantially balanced by the fluid pressure, the piston will cease to rise when the cable slackens. When the piston ceases to rise, pump pressure will open resistance valve 94 and fluid will flow to the tank. Since the drill tools have not yet neared the end of their normal downward stroke, the spudding mechanism has not reached a point on its upward stroke for cam 118, through linkages 116, 111, 110 and 106 (Figure 11), to shift spool 103 of pilot valve 101 to reverse the spudding mechanism to its tool-raising stroke (Figure 8). Accordingly, the spudding mechanism is stopped in this position.

A spudder-type cable-tool drill not so equipped with this safety feature, will continue spudding after the condition exists which creates such excessive length of working cable and the resulting cable whip may cause damage to the machine and cable if allowed to continue.

(4) MEANS FOR MAINTAINING PILOT PRESSURE

The means for maintaining pilot pressure continuously in this single pump system will now be explained.

Whenever the spudding mechanism is not spudding (control lever 114 in Figure 11 is set to "stop"), fluid flows from the pump back to the tank by overcoming the resistance of spring 96 to open resistance valve 94 (Figure 10) tending to block flow in exhaust passage 93 of spudder valve 60. Resistance valve 94 creates a back pressure in the system at this setting to provide pilot pressure at port 99 connected to pilot line 119 leading to pilot valve 101.

After the spudding mechanism is set to "start" with the piston 62 in raised position (Figures 8 and 11), pilot pressure begins shifting valve spool 88 to the right (first phase position in Figure 8). As land 88*c* of valve spool 88 crosses the point where passage 86 opens into valve spool chamber 87, the flow from the pump is further restricted so that pilot pressure increases when channel 86 is substantially closed off by land 88*c*. The velocity of shift of valve spool 88 increases as pilot pressure increases. When valve spool 88 has shifted to the right, the work-load requirement of piston 62 to raise the drill tools maintains pilot pressure during the tool-raising stroke. After the spudding mechanism has travelled a portion of its tool-raising stroke, cam 118 disengages with cam roller 116 and pilot valve 101 is shifted to its second-phase position shown in Figure 9. Pilot pressure then begins shifting valve spool 88 to the left. Here again as land 88*c* of valve spool 88 passes the opening of passage 86 into valve-spool chamber 87, pilot pressure is maintained. When valve spool 88 has shifted completely to the left and the drill-tool lowering stroke (Figure 10) begins, pilot pressure is maintained by resistance valve 94, as heretofore described.

(5) "PUMPING-OFF" A WELL

If the drill tools 56 are replaced by pumping tools, consisting of a long pump rod having a pump plunger attached to its lower end, the drill may then be used to "pump-off" a well. In pumping-off a well, the frequency of the spudding cycle must be very slow compared to the frequency of spudding cycle used for drilling.

To accomplish this low-frequency cycle, relief valve 136 (Figure 11) is adjusted to set the operating pressure of the system slightly higher than would be necessary to merely support the weight of the drill tools. The pump-raising stroke of the spudding mechanism will then be sufficiently slow so that the upward stroke of the pump plunger will not set up excessive turbulence in the water-bearing strata.

To decrease the downward velocity of the pumping tools on the tool-lowering stroke, resistance valve 94 of spudder valve 60 (Figure 10) may be adjusted to decrease the back pressure in the system. This adjustment is made by decreasing tension in spring 96. By decreasing the back pressure in cylinder 61 beneath piston 62 during its tool-lowering stroke, the rate of descent of the pump tools is purposely retarded, because the weight of the pump tools will be required to lift a part or all of the weight of piston 62 and its associated elements 63, 71, 118, 52 and 53. Since the weight of the pump tools suspended on cable 49 more nearly equals the weight of piston 62, and its associated elements 63, 71, 118, 52 and 53 than did the weight of the drill tools, this retarding of the descent of the pump tools by the spudding mechanism produced a much slower tool-lowering stroke than the unretarded tool-lowering stroke used in drilling.

At this setting of resistance valve 94, the reversal of the spudding mechanism from its tool-lowering stroke to its tool-raising stroke is less abrupt. By reducing back pressure in the system, pilot pressure at port 99 is also reduced. Thus, when near the bottom of the tool-lowering stroke, cam 118 engages cam roller 116 thereby actuating linkages 111, 110 and 106 (Figure 11) to shift pool 103 to its tool-raising setting in Figure 8, the pilot pressure in 119, 120, 104, 121, 122, 89 and 87 (to the left of land 88_a_ of valve spool 88) may be greatly decreased. By decreasing pilot pressure, the rate of shift of valve spool 88 is decreased. In this manner the reversal of the spudding mechanism from its tool-lowering stroke to its tool-raising stroke may be controlled to give a more gradual reversal than the quick reversal desired for drilling.

The above-described control feature has been tested under actual pumping conditions for pumping-off wells and it has been found that the vertical velocity of the spudding mechanism in either direction, plus the rate of shift of the spudding mechanism from its tool-lowering to its tool-raising stroke, all may be decreased to meet any requirement for this type of use.

*d. Description of the second embodiment*

Figures 12-17 show the second embodiment of this invention.

Figures 12, 13:
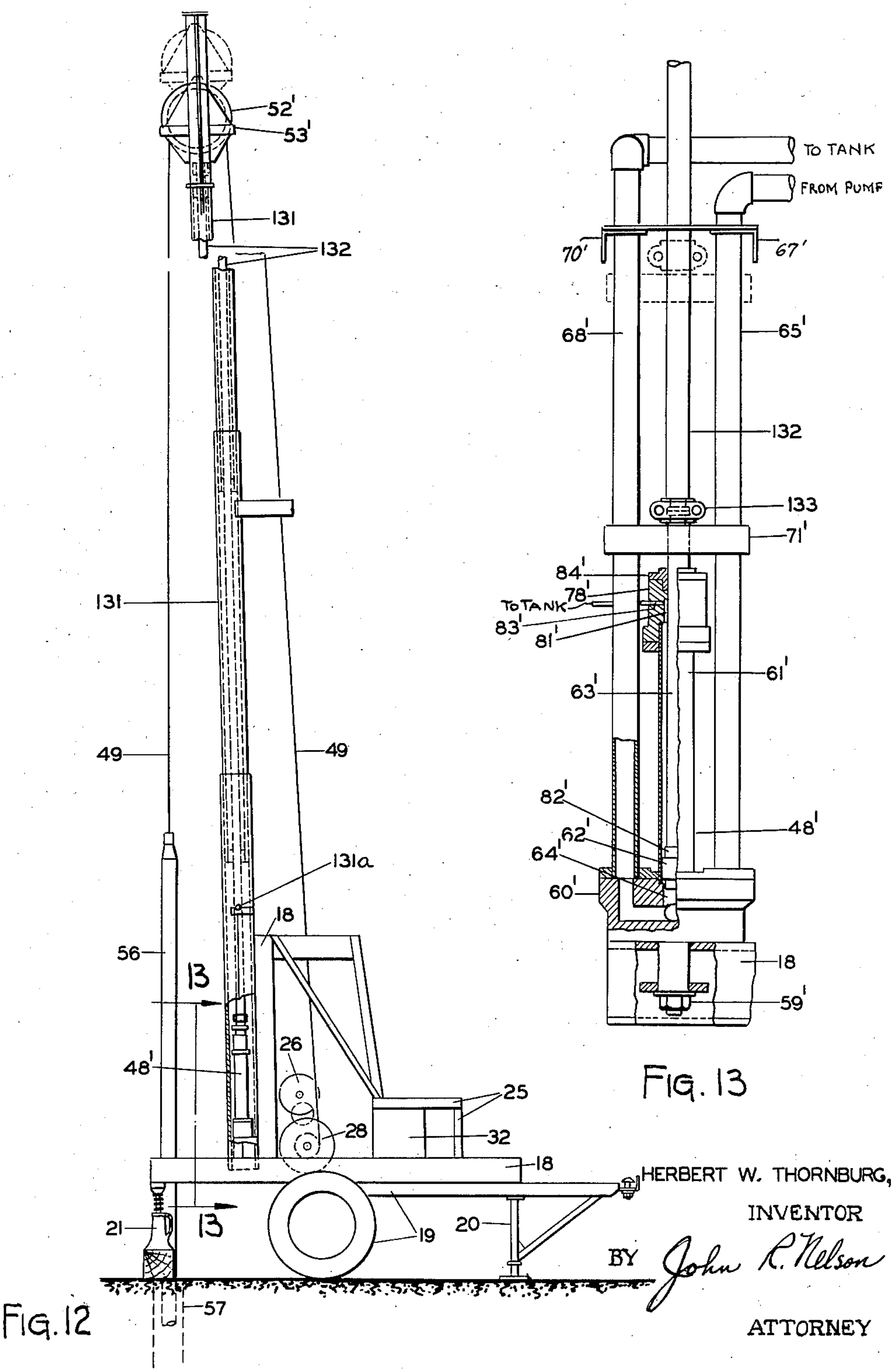
Figure 12 is a side elevation showing a drill representing the second embodiment of this invention.
Figure 13 is an enlarged view, partly in section, of the spudding mechanism taken along line 13—13 of Figure 12.

In Figure 12, drill frame 18 supported by wheeled chassis 19 supports derrick 131. Derrick 131 is made up of a plurality of tubular sections welded end to end and is not telescopic. The lower end of the derrick 131 below pivot pin 131_a_ is semi-cylindrical and is open toward the front end of the drill to the right in Figure 12. Cylinder-piston assembly 48' is supported on drill frame 18 by stud 59' (Figure 13) in the lower semi-cylindrical section of derrick 131. Derrick 131 folds for transport by rotating clockwise about derrick pivot pin 131_a_ (Figure 12) journalled in drill frame 18.

Since both telescopic folding derricks and nontelescopic folding derricks are well known in the art, and either type derrick is readily adaptable to this invention, the fact that the derrick is telescopic or not is immaterial to the present invention.

Push rod 132 is connected to the end of piston rod 63' above crosshead 71' by a coupling 133 (Figure 13). Spudding sheave 52' is journalled in spudding sheave block 53', which is slidably mounted at the top of the derrick 131 in any convenient manner for sliding up and down. Push rod 132 supports and reciprocates spudding sheave block 53'.

From winch drum 28, a cable 49 extends upwardly and over spudding sheave 52', then downwardly to support and reciprocate drill tools 56 carrying a bit (not shown).

By this arrangement it is seen that, during spudding, the reciprocating vertical motion of the spudding mechanism is substantially in phase with the reciprocating vertical motion of the drill tools.

In this embodiment, as was the case in the first embodiment, the angle between cable 49 from winch drum 28 to spudding sheave 52' and the derrick 131 is equal to the angle between cable 49 from spudding sheave 52' to drill tools 56 and the derrick 131. By this means, the derrick is at all times under a balanced loading forwardly and rearwardly, which eliminates need for external derrick braces or guy wires.

The winch and pump driving elements for the drill are the same as shown in Figure 4, previously described, and hence will not be again described.

Figure 17:
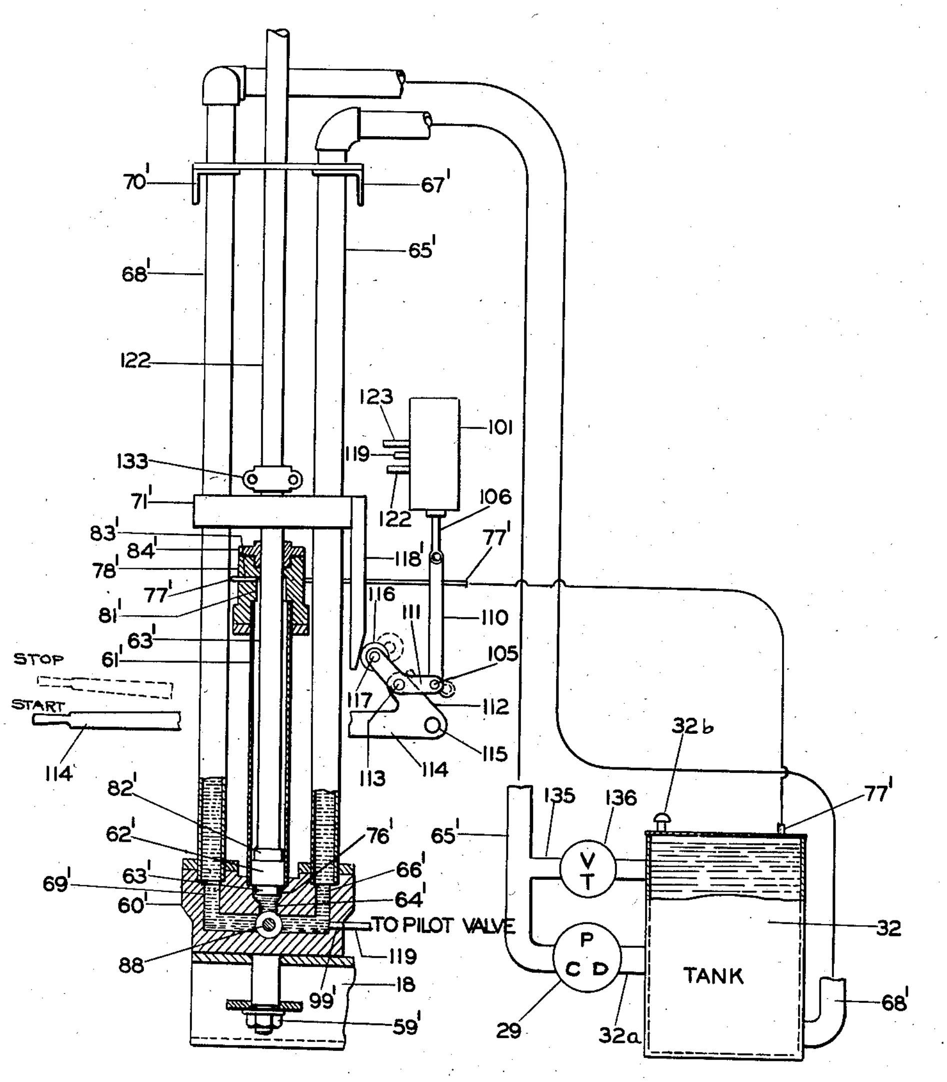
Figure 17 is a schematic side view of the spudding mechanism of the second embodiment of this invention taken along line 17—17 of Figure 16 shown near the end of the drill-tool-lowering stroke. The pilot valve is partially shifted to its tool-raising position.

In Figure 13, the cylinder-piston assembly 48' is similar to cylinder-piston assembly 48 (Figure 2) except for the following: cylinder-piston assembly 48' is inverted and reciprocates in phase with the drill tools. For this reason the combined function of crown sheave 54 and spudding sheave 52 of the first embodiment is now performed by spudding sheave 52'. Cylinder exhaust port 83' is connected to cylinder exhaust line 77', which drains into tank 32 (Figure 17). A small amount of fluid leaks past piston 62' which is returned to the tank through port 83' and line 77'. This amount of fluid also provides the hydraulic cushion at the upper end of cylinder 61' whenever piston 62' abuts the upper end of the cylinder. Spudder valve 60' is constructed differently, in that resistance valve 94' is shifted to a different position, hereinafter described more in detail. Cam 118' is now inverted, (Figure 17.)

Figure 14:
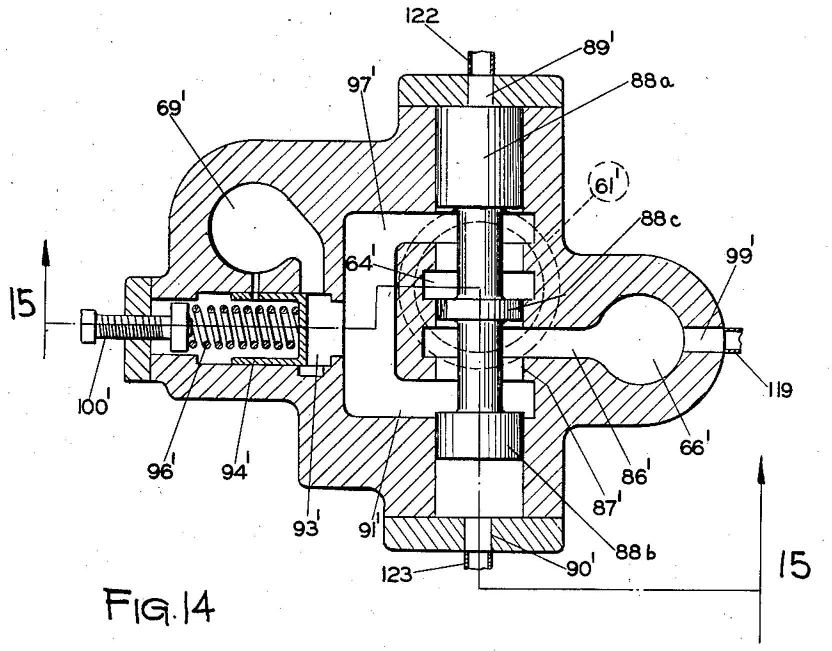
Figure 14 is a plan view of the spudding valve taken along line 14—14 of Figure 15.

In Figure 14, resistance valve 94' is seated in chamber 93' leading to exhaust port 69'. Fluid exhaust from the cylinder at cylinder port 64' now flows into passage 97', which joins chamber 93'.

Figure 15:
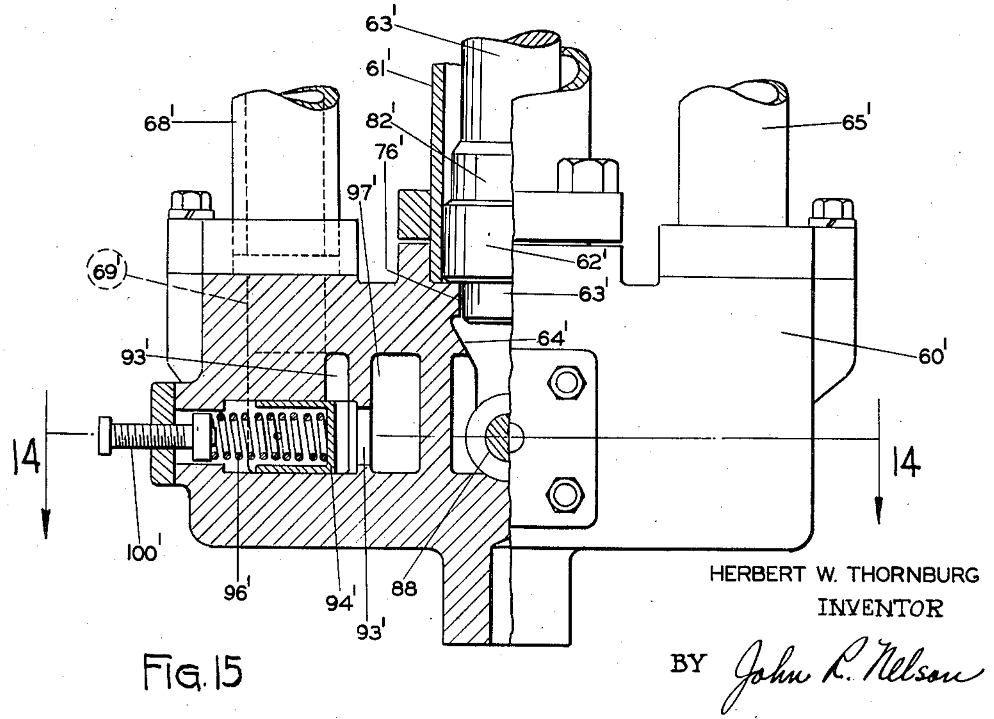
Figure 15 is a side view, partly in section, of the spudding valve and head of the cylinder-piston assembly taken along line 15—15 of Figure 14.

Figure 15 shows the side elevation of spudder valve 60' attached to the lower end of cylinder 61'. The same hydraulic cushion feature is provided at both ends of cylinder 61' as previously described for the ends of cylinder 61 in Figure 3.

Figure 16:
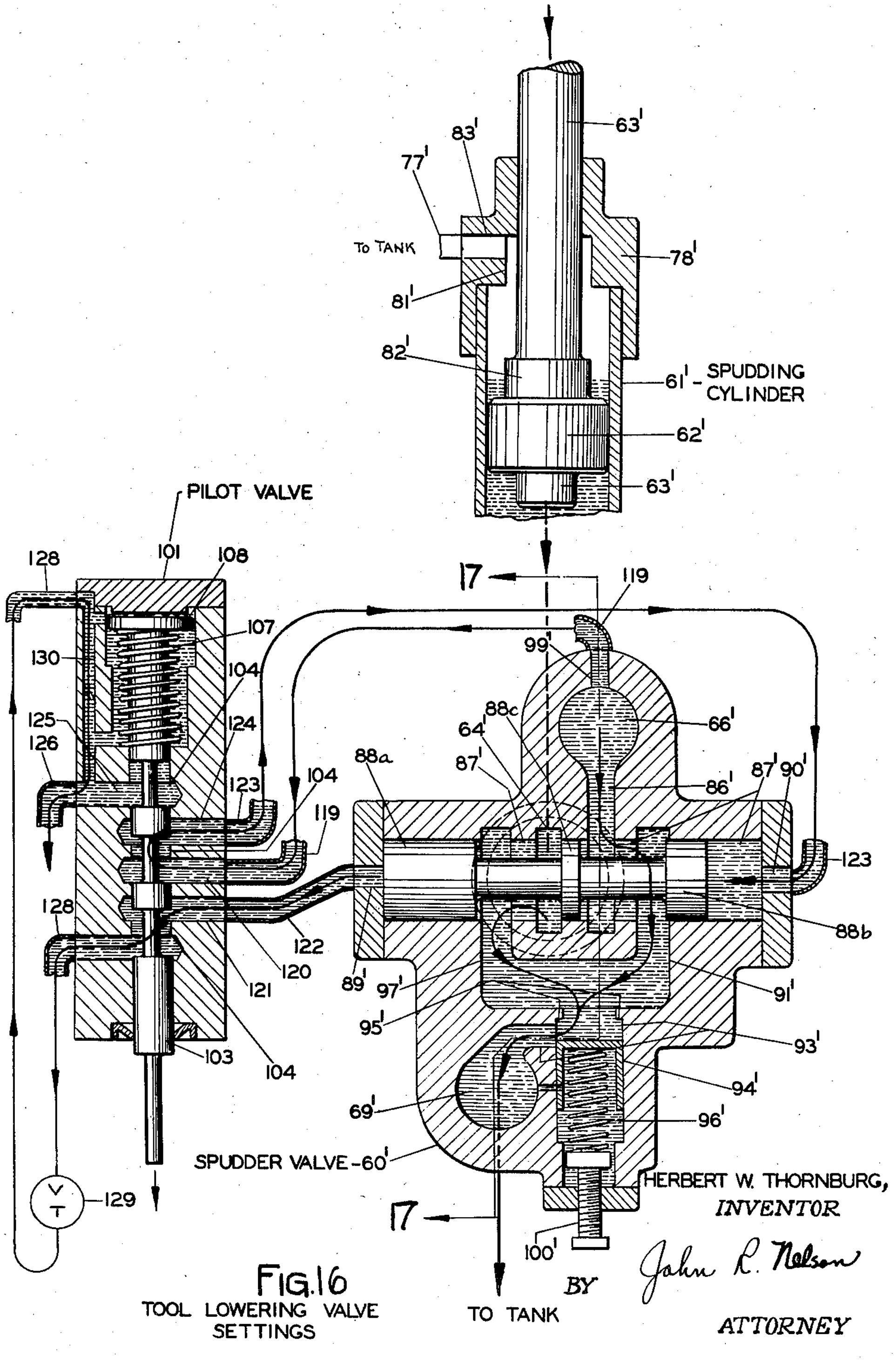
Figure 16 is a schematic plan view of the spudding valve, pilot valve and fluid circuits of the spudding mechanism for the second embodiment of this invention showing the valve settings for the drill-tool-lowering stroke.

Figures 16 and 17 show schematically the hydraulic spudding mechanism for the second embodiment of this invention. Its operation will now be described.

*e. Operation of the second embodiment*

Fluid from pump 29 enters spudder valve 60' (Figure 16) at inlet port 66'. If valve spool 88 is in the tool-lowering setting at the position shown in Figure 16, fluid then flows into valve-spool chamber 87' through passage 86', then into valve passage 91' and exhaust passage 93'. Spring 96' normally tends to seat resistance valve 94' in passage 93' to close said passage. The back pressure created by the resistance of resistance valve 94' is equal to pressure in cylinder 61' necessary to support piston 62', and associated elements 63', 71', 118', 133, 132, 53' and 52' against gravity. Resistance valve 94' is adjusted to this setting by adjustable screw 100' increasing or decreasing the tension in spring 96'.

When piston 62' is at the top of its stroke (top of the tool-raising stroke) and valve-spool 88 of spudder valve 60' has shifted to its tool-lowering setting, the spudding mechanism will lower with the slightest tension exerted in cable 49 by drill tools 56. Therefore, the drill tools, during their lowering stroke, fall substantially unretarded, except for the slight tension necessary in cable 49 pulling downward against spudding-sheave 52' to overcome this balance between the back pressure in cylinder 61' created by resistance valve 94' and the weight of piston 62' and associated elements.

As piston 62' is moved downward, fluid in the lower end of cylinder 61' exhausts through cylinder port 64' into passage 97'. Passage 97' joins passage 91' at the entry to chamber 93'. Fluid from the pump and the cylinder exhaust fluid then flow past resistance valve 94' in chamber 93' and to the tank through exhaust port 69' and fluid exhaust line 68'.

When piston 62' nears the bottom of its stroke (Figure 17), cam 118' engages cam roller 116. Continued downward travel of cam 118' rotates bellcrank 111 clockwise about pin 113 and linkage 110, 106 shifts spool 103 of pilot valve 101 downward. Spool 103 then diverts pilot fluid under pressure into pilot line 122 and valve spool 88 is quickly shifted to the right, as previously described in the first embodiment. At this point, land 88*a* of the valve spool blocks the entry to passage 97' in valve-spool chamber 87' and simultaneously land 88*c* of the valve spool directs pump flow from passage 86' into cylinder port 64' reversing piston 62' upwardly.

After piston 62' moves upwardly a sufficient distance, cam 118' on crosshead 71' and cam roller 116 are disengaged. Spring 107 then shifts spool 103 of pilot valve 101 to it supper position. The flow of pilot fluid under pressure into pilot line 123 shifts valve spool 88 to the left (Figure 16), but this shift is responsive to the rate that pilot fluid is permitted to exhaust from valve spool chamber 87' to the tank as previously described in the first embodiment. This exhaust of pilot fluid flows to the tank by way of passages 89', 122, 104 and 128, being metered through throttle valve 129 in exhaust line 128, then through 130 and 126. The amount of restriction in throttle valve 129 controls the rate of movement of valve spool 88 to the left. Regulation of the time rate of valve spool 88's leftward movement regulates the time duration that fluid under pressure is admitted into cylinder 61' at cylinder port 64'. Hence, by adjusting throttle valve 129, the operator is able to adjust the length of stroke of the spudding mechanism while it is in operation.

When valve spool 88 has shifted to the left so that its land 88*c* partially blocks passage 86', piston 62' will momentarily come to rest, then reverse to its tool-lowering stroke under the weight of the drill tools. As valve spool 88 shifts further to the left, passage 86' opens to permit fluid from the pump to flow through passage 91' to the tank past resistance valve 94'.

In Figure 17, control lever 114 is set to "start" and "stop" spudding in the same manner as described above for the first embodiment.

If, in this second embodiment, as in the first embodiment, after the spudding mechanism is reversed from its tool-raising to its tool-lowering stroke and the working length of cable 49 becomes excessive, the spudding mechanism will stop spudding, because there is insufficient tension in the cable on the tool-lowering stroke to bring the piston and cooperating cam to the end of their stroke to engage the mechanism for shifting the setting of pilot valve 101.

Pilot pressure is maintained in this embodiment whenever the pump is pumping fluid to the system. During the tool-lowering stroke, resistance valve 94' creates a back pressure which supplies pressure fluid to pilot line 119. As valve spool 88 shifts to the right (Figure 16), its land 88*c* partially blocks passage 86' and pilot pressure is then supplied by the pump directly. After the spudding mechanism shifts to the tool-raising stroke, the workload on piston 62' maintains the pressure in pilot line 119. When valve spool 88 shifts to the left (Figure 16) and its land 88*c* again partially blocks passage 86', pilot pressure is supplied directly by the pump.

Whenever the machine is not spudding and fluid is flowing from the pump back to the tank past resistance valve 94', the back pressure created furnishes pilot pressure to the pilot system.

In Figure 17, adjustable relief valve 136 is interposed in return line 135, and regulates the operating pressure of the spudding mechanism, but may also be used as a "stop-start" valve to supplement or replace control lever 114, as in the first embodiment.

Also, by detaching the drill tools from cable 49 and attaching pump rod and a plunger to cable 49 for reciprocation in the well hole, the drill may be readily adapted to "pump-off" a well. This process is accomplished in the same manner as described for the first embodiment.

In the claims the word "fluid" is to be understood to include pneumatic fluid as well as hydraulic fluid. In the case of pneumatic fluid the "sump" could of course be the atmosphere.

Although the spudder valve illustrated herein is pilot pressure fluid actuated into both its tool-raising and its tool-lowering positions, it is necessarily so actuated into only its tool-raising position, and may be actuated into its other position by other conventional means.

Although the spudder mechanism of this invention has been described with particular reference to actuation of the bit of a cable-type well drill, it is likewise well adapted for use with other types of vertically-reciprocated tools.

The first embodiment is the preferred showing of this invention, but both forms will operate efficiently and satisfactorily.

Having now described and illustrated two forms of the invention, it is to be understood that the invention is not to be limited to the specific form or arrangement of parts herein described and shown.

What is claimed is:

1. In a spudding mechanism, the combination of: a reciprocating spudder member adapted to impart vertical reciprocating motion to a tool; a pressure-fluid actuated cylinder-piston assembly connected to the spudder member to impart tool-raising motion thereto and including a main pressure-fluid chamber for tool-raising actuation of said assembly; a pressure-fluid source; a sump; a double-acting pilot pressure-fluid actuated reversing spudder valve; a pressure-fluid conduit connecting the spudder valve to the source; an exhaust conduit connecting the spudder valve to the sump; a cylinder conduit connecting the spudder valve to the main pressure-fluid chamber; said spudder valve having a pilot pressure-fluid actuated valve member shiftable alternatively (1) to connect the exhaust conduit to the cylinder conduit to exhaust the main pressure-fluid chamber, and (2) to block the connection of the exhaust conduit to the cylinder conduit and connect the pressure-fluid conduit to the cylinder conduit to actuate the cylinder-piston assembly to raise the tool; a first pilot pressure-fluid chamber in said spudder valve for actuating said valve member to shift onto its first-mentioned alternative setting; a second pilot pressure-fluid chamber in said spudder valve for actuating said valve member to shift into its second-mentioned alternative setting; a shiftable reversing pilot valve; means responsive to movement of the spudder member to shift the pilot valve; a first pilot conduit connecting the pilot valve to the first pilot chamber of the spudder valve; a second pilot conduit connecting the pilot valve to the second pilot chamber of the spudder valve; a pilot pressure-fluid conduit for supplying pressure fluid to the pilot valve; a first pilot exhaust conduit connected to the pilot valve to exhaust pressure fluid therefrom; a second pilot exhaust conduit connected to the pilot valve to exhaust pressure fluid therefrom; a throttle valve interposed in the second pilot exhaust conduit; said pilot valve having a valve member shiftable alternatively (1) to connect the pilot pressure-fluid conduit to the first pilot conduit and connect the second pilot exhaust conduit to the second pilot conduit and thereby direct pilot pressure fluid to the first pilot chamber of the spudder valve to shift the spudder valve member into its first-mentioned alternative setting and direct exhaust pilot pressure fluid from the second pilot chamber of the spudder valve through said throttle valve thereby retarding and controlling the rate of said shift of the spudder valve and controlling the length of stroke of the tool, and (2) to connect the pilot pressure-fluid conduit to the second pilot conduit and connect the first pilot exhaust conduit to the first pilot conduit and thereby direct pilot pressure fluid to the second pilot chamber of the spudder valve to shift the spudder valve into its second-mentioned alternative setting and direct flow of exhaust pilot pressure fluid from the first pilot chamber of the spudder valve unretarded by said throttle valve thereby achieving a rapid rate of shift of the spudder valve into said second mentioned setting.

2. A spudding mechanism according to claim 1, further characterized by the fact that the weight of the spudder member and the moving elements of the cylinder-piston assembly opposes the weight of the tool, and by having a second main pressure-fluid chamber in the cylinder-piston assembly for tool-lowering actuation of said assembly; a second cylinder conduit connecting said second main pressure-fluid chamber to the sump; a resistance valve interposed in said second cylinder conduit; and a second pressure-fluid conduit connecting the spudder valve to said second cylinder conduit intermediate said second main chamber and the resistance valve and connected by the spudder valve member in its first-mentioned alternative setting to the first pressure-fluid conduit, to thereby set up a back-pressure in said second main chamber; said resistance valve being proportioned to restrict normal flow of pressure-fluid through said first and second pressure-fluid conduits, when the spudder valve member is so set, to such a degree that said back pressure will balance the opposing forces attributable to the weight of the spudder member and the moving elements of the cylinder-piston assembly, to thereby achieve substantially free fall of the tool and synchronization of the spudding mechanism with the tool during said setting of the spudder valve member.

3. A spudding mechanism according to claim 1, further characterized by the fact that the pressure-fluid conduit and the exhaust conduit are parallel to the axis of reciprocation of the cylinder-piston assembly, that the cylinder-piston assembly includes a crosshead adapted to reciprocate with the reciprocating element of said assembly, and that said crosshead has guiding contact with said fluid conduits along their axes.

4. A spudding mechanism according to claim 1 further characterized by the fact that the pilot valve shifting means is responsive to actuate the pilot valve to assume its first mentioned alternative setting when the spudder member reaches a predetermined tool-raising position adjacent the commencement of its tool-raising stroke, and by the fact that the throttle valve is proportioned to restrict the flow of the exhaust fluid therethrough to such a degree that the spudder valve member continues to shift slowly into its first mentioned alternative setting throughout the remainder of the tool-raising stroke.

5. In a spudding mechanism, the combination of: a reciprocating spudder member adapted to impart vertical reciprocating motion to a tool; a pressure-fluid actuated cylinder-piston assembly connected to the spudder member to impart tool-raising motion thereto and including a first main pressure-fluid chamber for tool-raising actuation of said assembly and a second main pressure-fluid chamber for tool-lowering actuation of said assembly; said spudder member and the reciprocating elements of said assembly being arranged to oppose by gravity the weight of the tool; a pressure-fluid source; a sump; a double-acting reversing spudder valve; a first pressure-fluid conduit connecting the spudder valve to the source; an exhaust conduit connecting the spudder valve to the sump; a first cylinder conduit connecting the spudder valve to the main pressure-fluid chamber; a second cylinder conduit connecting said second main pressure-fluid chamber to the sump; said spudder valve having a valve member shiftable alternatively (1) to connect the exhaust conduit to the cylinder conduit to exhaust the main pressure-fluid chamber, and (2) to block the connection of the exhaust conduit to the cylinder conduit and connect the pressure-fluid conduit to the cylinder conduit to actuate the cylinder-piston assembly to raise the tool; a resistance valve interposed in said second cylinder conduit; and a second pressure-fluid conduit connecting the spudder valve to said second cylinder conduit intermediate said second main chamber and the resistance valve and connected by the spudder valve member in its first-mentioned alternative setting to the first pressure-fluid conduit, to thereby set up a back-pressure in said second main chamber; said resistance valve being proportioned to restrict normal flow of pressure-fluid through said first and second pressure-fluid conduits, when the spudder valve member is so set, to such a degree that said back pressure will balance the opposing forces attributable to the weight of the spudder member and the moving elements of the cylinder-piston assembly, to thereby achieve substantially free fall of the tool and synchronization of the spudding mechanism during said setting of the spudder valve member.

6. In a spudding mechanism, the combination of: a reciprocating spudder member adapted to impart vertical reciprocating motion to a tool; a pressure-fluid actuated cylinder-piston assembly connected to the spudder member to impart tool-raising motion thereto and including a main pressure-fluid chamber for tool-raising actuation of said assembly; a pressure-fluid source; a sump; a double-acting reversing spudder valve; a pressure-fluid conduit connecting the spudder valve to the source; an exhaust conduit connecting the spudder valve to the sump; a cylinder conduit connecting the spudder valve to the main pressure-fluid chamber; said spudder valve having a valve member shiftable alternatively (1) to connect the exhaust conduit to the cylinder conduit to exhaust the main pressure-fluid chamber and (2) to block the connection of the exhaust conduit to the cylinder conduit and connect the pressure-fluid conduit to the cylinder conduit to actuate the cylinder-piston assembly to raise the tool; means for actuating said valve member to shift into its first-mentioned alternative setting; a pilot pressure-fluid chamber in said spudder valve for actuating said valve member to shift into its second-mentioned alternative setting; a shiftable pilot valve; means responsive to movement of the spudder member to shift the pilot valve; a pilot conduit connecting the pilot valve to the pilot chamber of the spudder valve; a pivot pressure-fluid conduit for supplying pressure fluid to the pilot valve; a pilot exhaust conduit connected to the pilot valve to exhaust pressure fluid therefrom; a throttle valve interposed in the pilot exhaust conduit; said pilot valve having a valve member shiftable alternatively (1) to connect the pilot exhaust conduit to the pilot conduit and thereby direct exhaust pilot pressure fluid from the pilot chamber of the spudder valve through said throttle valve thereby retarding and controlling the rate of said shift of the spudder valve and controlling the length of stroke of the tool, and (2) to connect the pilot pressure-fluid conduit to the pilot conduit and thereby direct pilot pressure fluid to the pilot chamber of the spudder valve to shift the spudder valve into its second-mentioned alternative setting and permit a rapid unretarded rate of shift of the spudder valve into said second-mentioned setting; said pilot valve shifting means being responsive to actuate the pilot valve to assume its first mentioned alternative setting when the spudder member reaches a predetermined tool-raising position adjacent the commencement of its tool-raising stroke, and by the fact that the throttle valve is proportioned to restrict the flow of exhaust fluid therethrough to such a degree that the spudder valve member continues to shift slowly into its first mentioned alternative setting throughout the remainder of the tool-raising stroke.

References Cited in the file of this patent

UNITED STATES PATENTS

| | | |
|---|---|---|
| 2,739,573 | Hammer | Mar. 27, 1956 |
| 2,742,267 | Meier | Apr. 17, 1956 |
| 2,749,090 | Hudson | June 5, 1956 |